United States Patent
Kah et al.

(10) Patent No.: US 8,310,088 B2
(45) Date of Patent: Nov. 13, 2012

(54) FIELD DEVICE FOR A PROCESSING PLANT AND METHOD FOR SUPPLYING THE FIELD DEVICE

(75) Inventors: Harald Kah, Brechen (DE); Stefan Kolbenschlag, Darmstadt (DE)

(73) Assignee: Samson Aktiengesellschaft, Frankfurt (DE)

( * ) Notice: Subject to any disclaimer, the term of this patent is extended or adjusted under 35 U.S.C. 154(b) by 74 days.

(21) Appl. No.: 12/642,140

(22) Filed: Dec. 18, 2009

(65) Prior Publication Data

US 2010/0156183 A1 Jun. 24, 2010

(30) Foreign Application Priority Data

Dec. 23, 2008 (DE) .................. 10 2008 062 815

(51) Int. Cl.
*H02J 3/00* (2006.01)
*H02J 1/08* (2006.01)

(52) U.S. Cl. ............................................. 307/12; 307/66

(58) Field of Classification Search ............... 307/12, 307/64, 66; 700/275, 282, 297
See application file for complete search history.

(56) References Cited

U.S. PATENT DOCUMENTS

| 5,535,243 A | 7/1996 | Voegele et al. |
| 2006/0092039 A1 | 5/2006 | Saito et al. |

FOREIGN PATENT DOCUMENTS

| DE | 10 2004 004 930 A1 | 8/2005 |
| DE | 10 2004 059 106 A1 | 6/2006 |
| DE | 10 2006 011 503 A1 | 9/2007 |
| WO | WO 2006/127421 A2 | 11/2006 |

*Primary Examiner* — Carlos Amaya
(74) *Attorney, Agent, or Firm* — Schiff Hardin LLP

(57) ABSTRACT

In a method or device for powering a field device for a processing plant, the field device is driven by a process signal of an electrical power supply so that an electronic unit connected to the power supply outputs a process control signal. A required power level of the electronic unit is determined for outputting the control signal. A portion of an electrical power of the power supply exceeding the required power level is stored.

18 Claims, 3 Drawing Sheets

FIELD DEVICE FOR A PROCESSING PLANT AND METHOD FOR SUPPLYING THE FIELD DEVICE

BACKGROUND

The preferred embodiment relates to a field device, such as a positioner, an I/P-converter or the like for a processing plant, as well as to a method of energy supply for a field device.

Field devices used for process automation of a processing plant can be divided into two categories. These are on the one side field devices receiving and modulating a processing signal for providing a control signal, in particular a positioning signal. Such field devices are also referred to as output devices. Examples for field devices designed as output devices are the positioner or the current/pressure converter (I/P-converter). On the other hand, field devices can also be used to measure a physical quantity for a process automation system, such as temperature, pressure or flow rate, and are referred to as transducers. In the following, the preferred embodiment is described primarily with reference to the former, that is output devices such as positioners or I/P-converters. It is to be understood that the preferred embodiment can also relate to transducers.

For a simple representation and explanation in particular of an input side of a generic, known field device, see FIG. 1 showing a block diagram of the known field device.

Commonly, the field device a for process automation is constructed as follows. A known field device a can feature a pneumatic actuator b operating a control valve c by means of a drive rod, the valve being arranged within a duct that conveys a process fluid of the processing plant (not shown in the drawings). The field device a has an electronic unit d with an electrical signal output e connected to an I/P-converter f. The electronic unit d is connected with a position sensor g that transmits position signals of the drive rod to the electronic unit d via line h. The electronic unit d can feature a data storage unit and a micro-processor. The electronic unit d is preceded by an input circuit i that, together with a diode k, is used for limiting the input voltage of the electronic unit d. Furthermore, the input circuit i has a current measuring unit l as well as a measurement resistor $R_M$ at which the current of an input current signal i is measured. Subsequently, the current measuring unit l feeds the converted current signal to the electronic unit d.

The field device shown in FIG. 1 is a positioner system controlling a physical quantity, such as the flow rate of the processing plant. The field device a according to FIG. 1 can receive a process signal in the form of a current signal i from 4 to 20 mA. By means of a position signal of the position sensor g a control signal is calculated within the electronic unit d, which is fed to I/P-converter f. The I/P-converter f generates a pneumatic control signal that is fed to the pneumatic actuator b, which positions the control valve c accordingly.

The voltage present at the voltage limiting diode must be such that even in case of a zero point signal of 4 mA or slightly below (3.8 mA) sufficient energy is supplied to the electronic unit d. Allowing for the tolerances of the component parts, in particular the electronic unit d, a worst case situation must be considered in order to ensure that the provided voltage is always slightly higher than the voltage required by the electronic unit d. The unused energy is converted into heat in the voltage limiter of the diode k. Likewise for a higher current signal of for example 15 mA, all additional energy is dissipated into heat at the voltage limiting unit.

It shall be understood that the input circuit i can also be connected to a field bus. In this case, the field device is supplied with a constant current of for example 15 mA while the supply voltage may vary between 9 and 32V. Therein, a current controller may utilize a measurement resistor in order to measure the loop current, and drives a transistor such that the current is controlled to be constant. For a field bus connection, the current should be maintained constant because for the digital field buses in consideration, the current is modulated without a mean value in order to encode digital information.

Because of their wide ranging functionality and their high safety standards, positioners and also I/P-converters are often equipped with a number of electronic components or at least high quality electronic components. Positioners designed to fulfil multiple tasks comprise a micro-processor, possibly several data storage units, communication units such as wireless transmitters and receivers, and several sensing devices such as a position sensor.

In the area of process automation, there is a general interest to fit up field devices with further reaching additional functions such as functional diagnosis, self-surveillance, etc., whereby not only the capability of the field device is increased but also the number of components and the energy consumption of the field device.

However, for the known field devices, the available electrical energy is limited also because of ignition protection regulations.

There are efforts to increase the amount of electrical energy provided to the field device. For example, for the energy supply method known as Energy Harvesting energy already present, such as pneumatic drive energy or flow energy of the process medium of the processing plant is used. Therein, piezo-electric and thermo-electric energy exchange principals are applied. The Energy Harvesting method has the principal disadvantage of high technical expenditure, especially in view of the necessary ignition protection and a precise energy conversion technique.

For example from DE 10 2006 011 503 a process automation field device such as a positioner is known that is fitted with an energy converter converting flow energy of the process fluid into electrical energy. DE 10 2004 004 930 A1 also discloses an energy conversion unit for which a mechanical pendulum is exposed to a pneumatic power source, thereby stimulated to oscillate, and the oscillations are converted into electrical energy.

DE 10 2004 059 106 B4 suggests a further method for providing electrical energy to a field device by means of energy conversion. For supplying energy to a field device, a secondary winding is arranged around an electrical supply line of the processing plant. Owing to the induction fields around the electrical supply line, electrical energy can be provided to the field device.

A further method for providing energy to field devices is described in WO2006/127421 A2. There the field device is coupled to a HART field bus via a Zener diode. A power controller is provided acting as a negative resistance. For a constant supply current of for example 4 mA, the power controller causes an increase of the connected compliance voltage of for example 9V to 11V thereby providing an increased electrical power of 44 mW by the master controller. Such an additional energy supply has the disadvantage that the master controller of the processing plant, which for example is connected to the field device via a field bus, cannot supply sufficient electrical power in order to provide the increased compliance voltage. Furthermore, the control circuit for raising the supply voltage by means of the power controller has a complicated structure. Furthermore, a higher energy consumption must be assigned to the field device. Moreover, for the known additional energy supplies it is not guaranteed that the constant control current value is not negatively affected by the variation of the compliance voltage.

SUMMARY

It is an object to provide a simple field device as well as a simple method of power supply to the field device that can provide energy with small losses and without large structural and electro-technical complexity.

In a method or device for powering a field device for a processing plant, the field device is driven by a process signal of an electrical power supply so that an electronic unit connected to the power supply outputs a control signal. A required power level of the electronic unit is determined for outputting the control signal. A portion of an electrical power of the power supply exceeding the required power level is stored.

DESCRIPTION OF THE PREFERRED EMBODIMENTS

Figure 1:
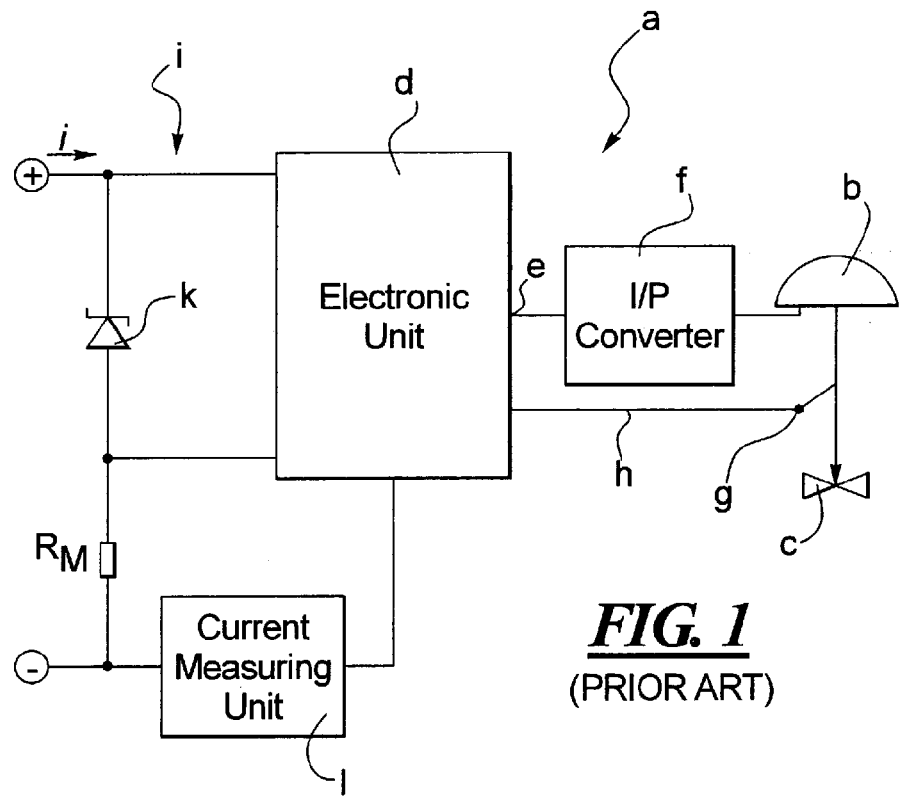
FIG. 1 is a block diagram of a known prior art field device.

For the purposes of promoting an understanding of the principles of the invention, reference will now be made to the preferred embodiments/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

An idea of the preferred embodiment is to avoid dissipation of electrical energy into heat for example within a voltage limiting unit. Rather, the excess energy is to be saved in an electrical storage unit for releasing the stored energy during a low of the usual power supply.

In a field device according to the preferred embodiment, such as a positioner, an I/P-converter or the like for a processing plant has an electrical input to which an electrical power supply can be connected. The power supply can either be formed by a process signal comprising a current signal of 4 to 20 mA and a supply voltage range of 9 to 32V typical for a HART field bus. The field device according to the preferred embodiment has an electronic unit for processing the process signal. An input circuit connected between the input and the electronic unit is provided for limiting the supply voltage of the electronic unit. This technique is meant to assure sufficient ignition protection and overvoltage protection for the electronic components of the electronic unit.

According to the preferred embodiment, the input circuit has a storage unit for electrical energy and a power management circuitry comprising a power requirement acquisition unit for determining and/or receiving a required power level necessary for processing, in particular generating and outputting a control signal by the electronic unit. Thus, the power requirement acquisition unit is to determine the actual power usage of the electronic unit in order to determine whether or not the unused portion of the electrical power at the input circuit can be diverted in order to supply the excess energy to the electrical energy storage unit. The power management circuitry can determine the amount of electrical energy exceeding the required power level and divert it to the electrical storage unit for charging.

The technique according to the preferred embodiment facilitates enlargement of the functionality of field devices because more electrical power is available without energy conversion from other power sources or modification of the power supply of the field device. Also the precise process signals serving the provision of power are not affected by the power management according to the preferred embodiment.

In a preferred embodiment the power requirement acquisition unit has a signal connection to one power consumer of the field device such as a micro-processor, a display, at least one sensor, one signal module, etc., respectively. The signal connection occurs such that the power requirement acquisition unit knows the actual power consumption of the respective power consumer of the field device at any time. Additionally, the storage unit can be electrically connected via a connecting circuit to one power consumer of the field device such as a micro-processor, a display, at least one sensor, a radio signal transmission, etc., respectively. Via the energy supply unit, the storage unit can drive the respective power user with the stored electrical energy.

In a preferred embodiment, the storage unit is implemented intrinsically safe, in particular cast into synthetic material.

In a further development of the preferred embodiment, the storage unit is a capacitor, in particular a double layer capacitor, an electrolyte capacitor, or an accumulator, in particular a lithium accumulator.

The power management circuitry can be adjusted such that in case of a failure of the permanent electrical power supply at least one pre-determined power user of a field device, such as a sensor, a data storage unit, a combination device, etc., remains electrically supplied by the storage unit.

Preferably, the input circuit has a comparison unit for comparing the required power level with an actual power level supplied to the input in order to identify a power amount that can be diverted for storage in the electric storage unit. Therein, the comparison units may feature a circuit in which a voltage limiter, in particular a diode is integrated.

In a preferred embodiment, the comparison unit is fitted with an electrical resistor, an electronic component for detecting a voltage drop across a resistor, and a load switch connected with the electronic component. The load switch has a passive switching status in which an electrical connection between the storage unit and the input is interrupted, and an active switching status in which the electrical connection between the storage unit and the input is closed for charging the storage unit.

Preferably, the electronic component activates the switch for changing from the passive switching status to the permanent active switching status then when a voltage drop is detected across the resistor. Preferably, the electronic component is an operational amplifier. The load switch may be a transistor.

In a further development of the preferred embodiment, the power management circuitry has a voltage-current converter connected downstream to the storage unit and adapting the current intensity by altering the voltage in dependence on the power consumer to be supplied by the storage unit. Therein, the voltage-current converter can be implemented as a step-up and/or step-down converter.

In a preferred embodiment, the power management circuitry has a connecting circuitry capable of interrupting or closing a supply line to a respective power consumer of a field device, wherein for a closed power supply line the respective consumer draws electrical power from the storage unit either directly or in particular via a voltage-current converter. Preferably, the connecting circuit feeds a switch controller which controls an individual switch for each power consumer of the field device, wherein each individual switch can be implemented as an electronic switch.

In a further development, the power management circuitry is designed to close pre-determined individual switches of the connecting circuitry in case of failure of the electrical power supply and/or an undersupply of power with respect to the power requirement of the field device.

Furthermore, the preferred embodiment relates to a method for powering a field device for a processing plant, such as a positioner, an I/P-converter or the like, wherein the field device is driven by an electrical power supply, in particular a 4 to 20 mA current signal as a process signal for positioning a positioning member or by a field bus for generating and outputting a control signal. According to the preferred embodiment, a required power level of the electronic unit for outputting the control signal is determined and an electrical power portion of the power supply exceeding the required power level is stored.

According to the preferred embodiment, the stored energy is used for driving power consumers of the field device.

It is to be understood that the method according to the preferred embodiment may be laid out in accordance to the functionality of the field device according to the preferred embodiment.

Further characteristics, advantages and features of the invention will become apparent in the following description of a preferred embodiments in conjunction with the accompanying drawings, in which is shown the following described hereafter.

Figure 2:
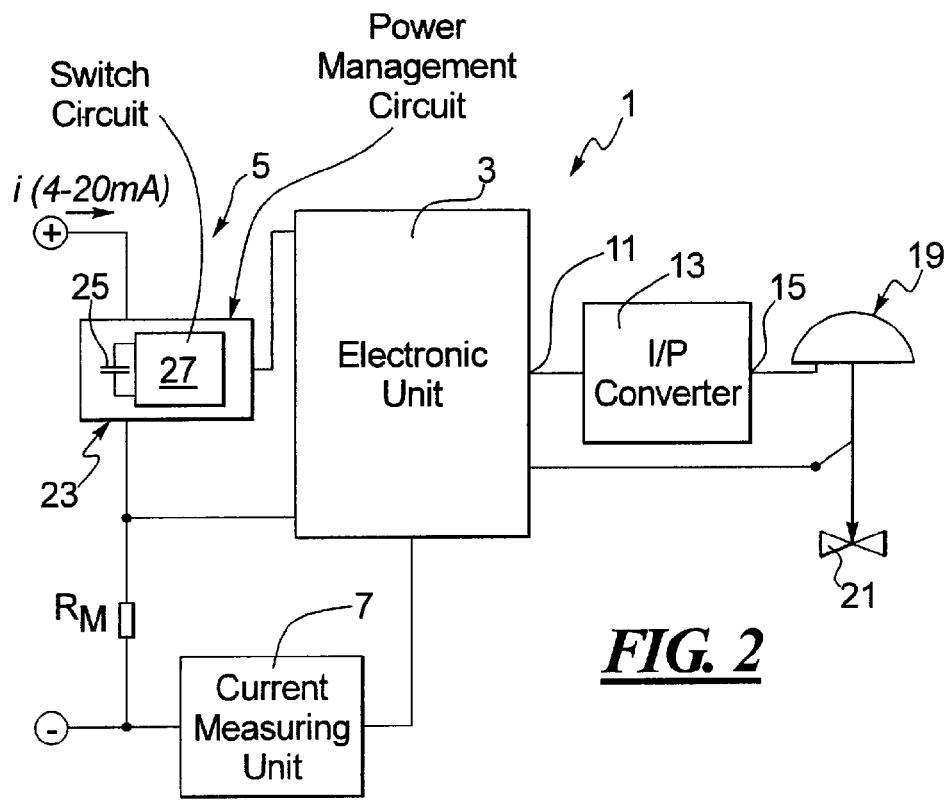
FIG. 2 is a block diagram of a first embodiment of a field device.

FIG. 2 represents a preferred embodiment in which a field device implemented as an output device according to FIG. 1 is further developed. The field device according to the preferred embodiment, shown in FIG. 2, is generally given the reference numeral 1 and comprises an electronic unit 3, an electronic input circuit 5, and a current measuring unit 7 for converting and transmitting a process signal i as a current signal to the electronic unit 3.

The electronic unit 3 has a pneumatic output 11, connected to an I/P-converter 13. The I/P-converter 13 is connected to a pneumatic power source providing for example a constant pressure supply of 6 bar. An output 15 of the I/P-converter 13 is connected with pneumatic actuator 19 which actuates a control valve 21 according to the pneumatic control signal of the I/P-converter 13. The preferred embodiment relates to the input circuit 5 which receives a 4 to 20 mA process signal i.

The process signal i is directly connected with a power management circuit 23, which features an electrical storage unit in form of a capacitor 25 as well as a switch circuit 27 with the function of providing power management for the power consumers, in particular the electronic unit 3 of the field device 1. The switch circuit 27 charges the capacitor 25 in dependence of the energy content of the provided process signal i, in particular then when more electrical power is available through the process signal i than is used by the electronic unit 3. The switch circuitry has also the function of withdrawing energy from the capacitor 25 in case that supply of additional power to the electronic unit 3 is necessary. Thus, the power management circuit 23 of the field device 1 can cover a varying power requirement of the field device 1 according to its operating condition. In particular, the power management circuit 23 can recognize a difference between the electric power provided by the process signal i and the outgoing power for driving the field device 1 wherein the power management circuit 23 diverts excess power to the energy storage unit, for example implemented as capacitor 25. It shall be understood that additional energy can be supplied by the capacitor 25 also to the I/P-converter 13 additionally or instead of to the electronic unit 3. In particular, power can be supplied over short periods by the energy storage unit 25 to a power consumer of the field device 1 in order to enable in particular the sending of radio telegrams. This means that even in case of failure of the entire power supply the field device 1 can self-sufficiently continue to ensure a certain operation, for example to securely store valve positions. According to the preferred embodiment, there is no additional energy usage.

Figure 3:
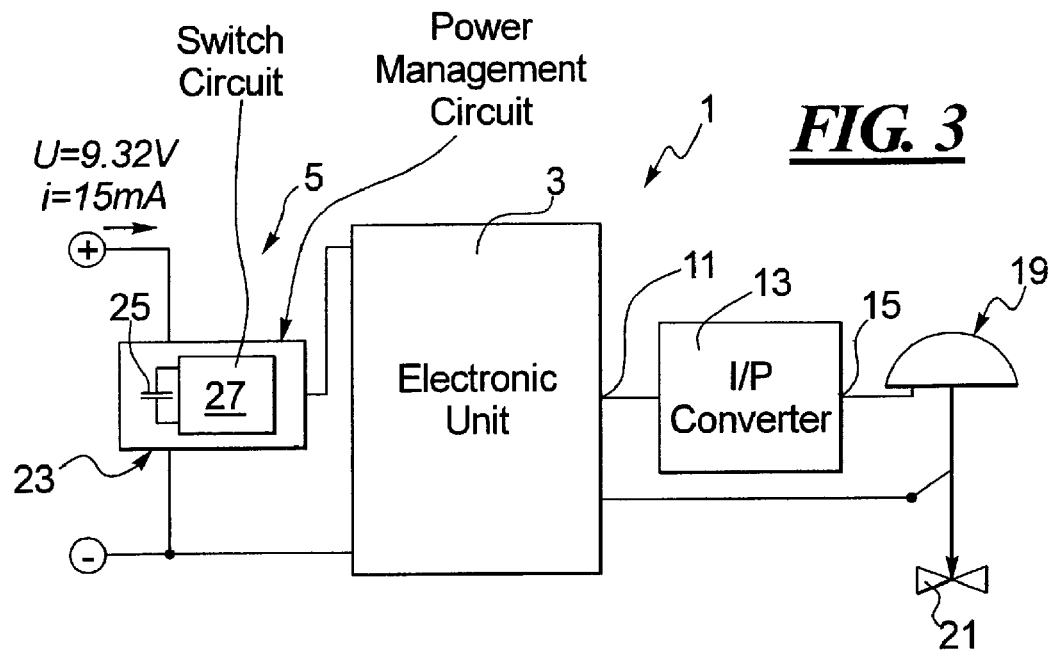
FIG. 3 is a block diagram of a second embodiment of a field device.

FIG. 3 represents a power management circuit 23 according to the preferred embodiment in case of a field bus device. For convenient legibility same reference numerals are used for same or similar components of the field device according to FIG. 1.

As in FIG. 2, a voltage limiter in form of a known Zener diode k is replaced by a power management circuit 23. This current controller is an integral component of the power management circuit in the switch circuit 27.

Figure 4:
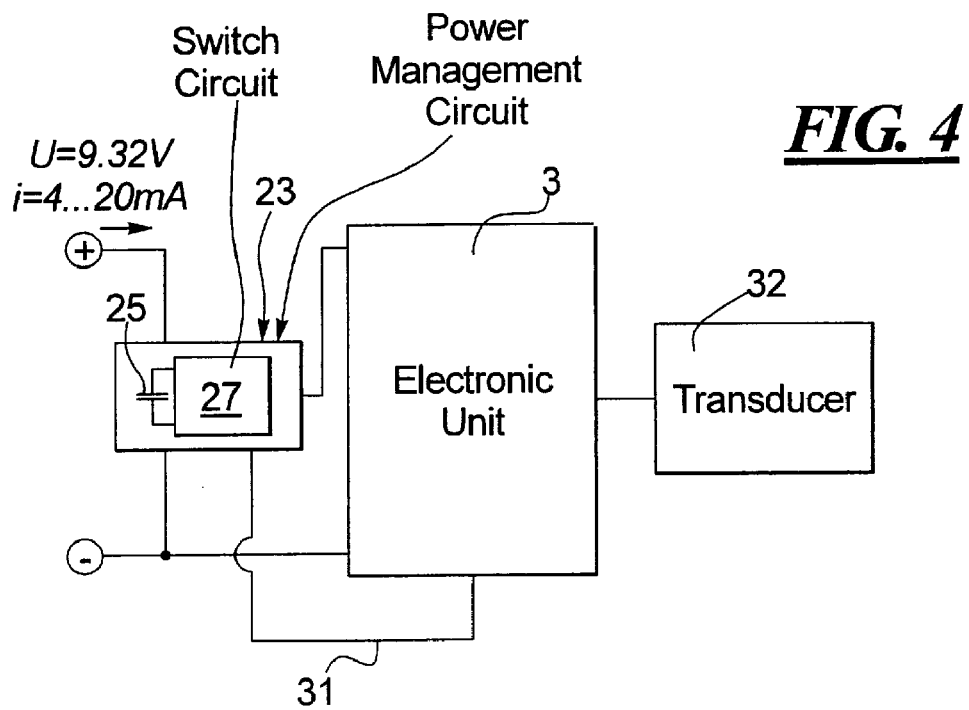
FIG. 4 is a block diagram of a third embodiment of a field device.

For the transducer structure according to the preferred embodiment shown in FIG. 4, same reference numerals are again used for same components in order to enhance readability of the figure description.

The embodiment according to FIG. 4 differs from the one according to FIG. 3 in that a transducer 32 is provided instead of an output device. The power management circuit 23 recognizes the current energy requirement of the electronic unit 3 and stores energy in the capacitor 25 if the energy requirement is lower than the present power supply. Vice versa, the power management circuit 23 also knows the amount of energy present in the energy storage unit and can provide power for the electronic unit 3, in particular over short periods. For this case, the power management circuit 23 comprises a current controller that processes a feedback signal 31 of the electronic unit 3 which for example represents a physical quantity such as the position of the positioning member.

Figure 5:
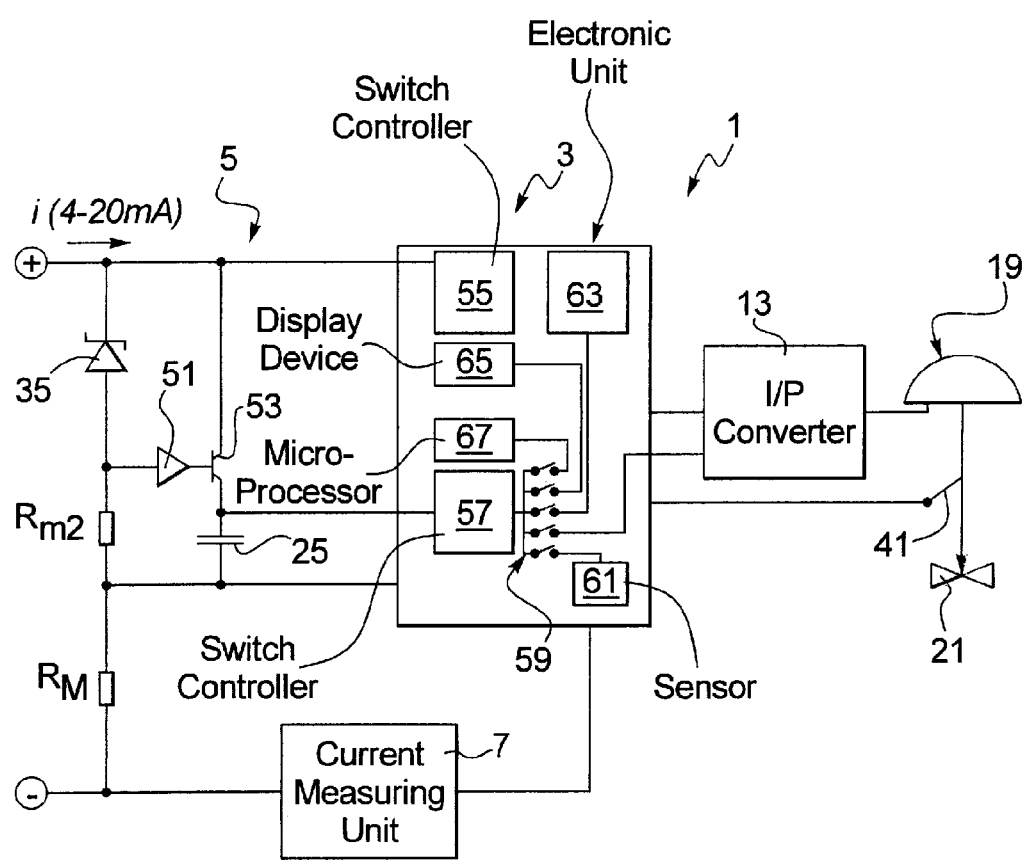
FIG. 5 is a schematic block diagram of a fourth embodiment of a field device.

FIG. 5 shows in detail a circuit of the field device according to the preferred embodiment. Again, same reference numerals are used for identical components as in the above explanations.

In FIG. 5, the input circuit 5 as well as the electronic unit 3 are represented in more detail, the electronic unit 3 being connected to a pneumatic actuator 19 via an I/P-converter 13. A position sensor 41 senses a position of the actuator and transfers position signals to the electronic unit 3.

A Zener diode 35 or a respective electronic circuit comprising a measurement resistor $R_{m2}$ connected in line are used for limiting the voltage of the input circuit 5. Moreover, the input circuit 5 has a capacitor 25 as an energy storage unit which is connected in parallel to a measurement resistor $R_{m2}$.

An operational amplifier 51 detects the voltage drop across the measurement resistor $R_{m2}$ as soon as a current passes through the measurement resistor $R_{m2}$. The operational amplifier 51 responds already to a minimal voltage across the measurement resistor $R_{m2}$ and then drives a transistor 53 so that the capacitor 25 is charged as soon as a current is passing through the measurement resistor $R_{m2}$. By this technique energy available above the minimal current is not dissipated into heat at the Zener diode 35 but conducted to the capacitor 25 and stored therein.

For a controlled process signal current i (4 to 20 mA) of for example 4 mA only a small current can pass through the measurement resistor $R_{m2}$ and the capacitor 25 is only charged to a small extent. If a higher process signal current i of for example 25 mA is present, the capacitor 25 is charged faster accordingly.

The field device 1 according to the preferred embodiment has a particularly designed electronic unit 3 that is provided with components that can also be assigned to the power management circuit.

The input of the electronic unit 3 is formed by a first switch controller 55 with the function to adapt the input current process signal i to the consumers of the electronic unit 3 with minimum power losses. At this position in particular a drop in voltage and a rise in current intensity are favorable. Commonly, this type of function switch controller 55 is referred to as a step-down switch controller.

A second switch controller 57 has the function of converting the voltage and current intensity of the electric charge stored on the capacitor 25 via a connecting circuit to the controller 57. A group of switches 59 consisting of five individual switches, which can be implemented as electronic switches, is directly assigned to the second switch controller 57. The electronic switches can open and close an electric connection to the individual power consumers of the electronic unit 3 and I/P-converter 13, in order to ensure an appropriate power supply via the capacitor.

Components considered as power consumers are for example a sensor 61, which, for example, can be a position sensor, a wireless module 63, an output or display device 65, and/or a micro-processor 67. Only in special operational situations the Zener diode will effectively function as a voltage limiter converting electric energy into heat. This is the case if for example the energy storage unit 25 is not capable anymore to absorb electric energy from the operational amplifier 51.

Consequently, the possibilities for utilization of the energy stored on the capacitor 25 are manifold. For example, a radio signal can be sent via Blue Tooth or ZigBee within certain time intervals. In case of failure of the main power supply (process signal i), the micro-processor 67 and also the I/P-converter 13 can be supplied with the electrical energy of the capacitor 25, for example in order to store important operating parameters such as the position of the control valve 21. Furthermore, diagnosis and alarm data can also be sent from the micro-processor 67 to a master controller (not shown).

In case of failure of the electrical current process signal i for example, also the display device can be supplied with power in order to generate and display an alarm.

If the sensor 61 is to be supplied with power, in case of a power failure, for example the actuation pressure can continue to be measured if the sensor is a pressure sensor.

A voltage measurement unit may be assigned to the capacitor 25 in order to capture the amount of its stored energy. According to the power consumers 61 to 67 to be supplied, the switch controller 25 can be designed either as step up or as step down controller.

In order to render the field device 1 intrinsically safe according to the preferred embodiment, the capacitor 25 can be cast into synthetic material. Preferably the capacitor 25 is formed as a double layer capacitor like the so-called Gold-Cap, or as an electrolytic capacitor or a lithium accumulator. Furthermore, the energy storage unit can be composed of several smaller energy storage units, respectively provided for supplying different power consumers connected in parallel.

While preferred embodiments have been illustrated and described in detail in the drawings and foregoing description, the same are to be considered as illustrative and not restrictive in character, it being understood that only the preferred embodiments have been shown and described and that all changes and modifications that come within the spirit of the invention both now or in the future are desired to be protected.

What claim as our invention:

1. A field device for a processing plant, comprising:
    an electrical input to which an electrical power supply is connected, an electronic unit for processing a process signal from the electrical input, and an input circuit connected between the electrical input and the electronic unit for limiting a supply voltage fed to the electronic unit;
    the input circuit comprising a power management circuit comprising a storage unit for electric energy and a power requirement acquisition unit for at least one of determining and receiving a current required power level necessary for processing the process signal by the electronic unit; and
    the power management circuit charging into the electrical storage unit an amount of electrical energy of the power supply connected to the input circuit that exceeds the current required power level and supplying stored energy from the electrical storage unit to the electronic unit when necessary.

2. The field device according to claim 1 wherein the power requirement acquisition unit has a signal connection via a connecting circuit to a power consumer of the field device.

3. The field device according to claim 1 wherein the storage unit is electrically connected via a connecting circuit to a power consumer of the field device.

4. The field device according to claim 1 wherein the storage unit comprises a capacitor.

5. The field device according to claim 1 wherein the power management circuit is adjusted such that in case of a failure of the electrical power supply at least one pre-determined power user of the field device remains electrically supplied by the storage unit.

6. The field device according to claim 1 wherein the input circuit comprises a comparison unit for comparing the required power level with an actual power level supplied to the electrical input.

7. The field device according to claim 6 wherein the comparison unit features a circuit in which a voltage limiter is integrated.

8. The field device according to claim 1 wherein the power management circuit has a connecting circuit capable of interrupting or closing a power supply line to a respective power consumer of the field device and wherein for a closed power supply line the respective consumer draws electrical power from the storage unit directly.

9. The field device according to claim 8 wherein the connecting circuit controls an individual switch for the respective power consumer of the field device, and wherein each individual switch is implemented as an electronic switch.

10. The field device of claim 1 wherein the field device comprises at least one of the elements selected from the group consisting of a positioner and an I/P converter.

11. A field device for a processing plant, comprising:
    an electrical input to which an electrical power supply is connected, an electronic unit for processing a process signal, and an input circuit connected between the electrical input and the electronic unit for limiting a supply voltage fed to the electronic unit;

the input circuit comprising a power management circuit comprising a storage unit for electric energy and a power requirement acquisition unit for at least one of determining and receiving a required power level necessary for processing the process signal by the electronic unit;

the power management circuit charging into the electrical storage unit an amount of electrical energy of the power supply connected to the input circuit that exceeds the current required power level;

the input circuit comprising a comparison unit for comparing the required power level with an actual power level supplied to the electrical input; and the comparison unit being fitted with an electrical resistor, an electronic component for detecting a voltage drop across the resistor, and a load switch connected with the electronic component, the load switch having a passive switching status in which an electrical connection between the storage unit and the electrical input is interrupted, and an active switching status in which the electrical connection between the storage unit and the electrical input is closed for charging the storage unit.

12. The field device according to claim 11 wherein the electronic component activates the load switch for changing from the passive switching status to the active switching status when a voltage drop is detected across the resistor.

13. The field device according to claim 11 wherein the electronic component comprises an operational amplifier.

14. The field device according to claim 11 wherein the load switch comprises a transistor.

15. A field device for a processing plant, comprising:

an electrical input to which an electrical power supply is connected, an electronic unit for processing a process signal, and an input circuit connected between the electrical input and the electronic unit for limiting a supply voltage fed to the electronic unit;

the input circuit comprising a power management circuit comprising a storage unit for electric energy and a power requirement acquisition unit for at least one of determining and receiving a required power level necessary for processing the process signal by the electronic unit;

the power management circuit charging into the electrical storage unit an amount of electrical energy of the power supply connected to the input circuit that exceeds the current required power level; and the power management circuit having a voltage-current converter connected downstream to the storage unit and adapts current intensity by altering the supply voltage in dependence on a power consumption of the field device to be supplied by the storage unit.

16. The field device according to claim 14 wherein the voltage current converter is implemented as a step-up or a step-down converter.

17. A field device for a processing plant, comprising:

an electrical input to which an electrical power supply is connected, an electronic unit for processing a process signal from the electrical input, and an input circuit connected between the electrical input and the electronic unit for limiting a supply voltage fed to the electronic unit;

the input circuit comprising a power management circuit comprising a storage unit for electric energy and a power requirement acquisition unit for at least one of determining and receiving a current required power level necessary for processing the process signal by the electronic unit;

the power management circuit charging into the electrical storage unit an amount of electrical energy of the power supply connected to the input circuit that exceeds the current required power level; and the power management circuit being designed to close via a connecting circuit pre-determined individual switches of the electronic unit in case of failure of the electrical power supply or an undersupply of power to the field device.

18. A field device for a processing plant, comprising:

an electrical input to which an electrical power supply is connected, an electronic unit for processing a process signal from the electrical input, and an input circuit connected between the electrical input and the electronic unit for limiting a supply voltage fed to the electronic unit;

the input circuit comprising a power management circuit comprising a storage unit for electrical energy and a power requirement acquisition unit for obtaining a current required power level necessary for processing the process signal by the electronic unit; and the power management circuit charging into the electrical storage unit an amount of electrical energy of the power supply connected to the input circuit that exceeds the required current power level and supplying stored energy from the electrical storage unit to the electronic unit when necessary.

* * * * *